S. STUART.
Shaft-Couplings.

No. 157,427.  Patented Dec. 1, 1874.

UNITED STATES PATENT OFFICE.

SINCLAIR STUART, OF NEW YORK, N. Y.

IMPROVEMENT IN SHAFT-COUPLINGS.

Specification forming part of Letters Patent No. 157,427, dated December 1, 1874; application filed September 15, 1874.

*To all whom it may concern:*

Be it known that I, SINCLAIR STUART, of New York, in the county and State of New York, have invented an Improved Shaft-Coupling, of which the following is a specification:

This invention relates to a method of uniting or repairing the ends of broken shafts, more especially of the shafts of screw-propellers when broken at sea.

The invention consists of a divided clamp or coupling arranged to surround the contiguous ends of the broken shaft, and boring or drilling a series of holes entirely through said clamp into the shaft, and then driving pins through the openings in the clamp into the openings in the shaft, after which the projecting ends of said pins may be cut off flush with the surface of the clamp, and the same calked to prevent displacement.

Figure 1:
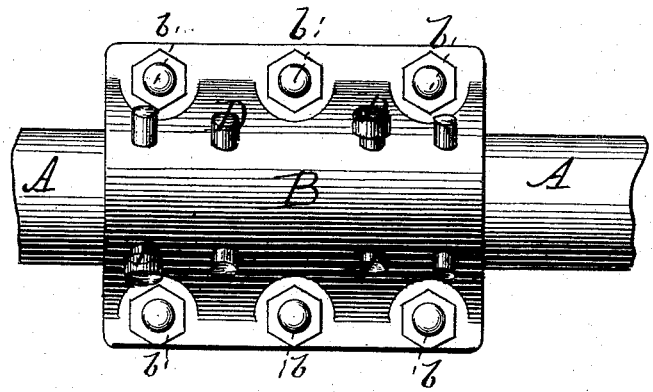
Figure 2:
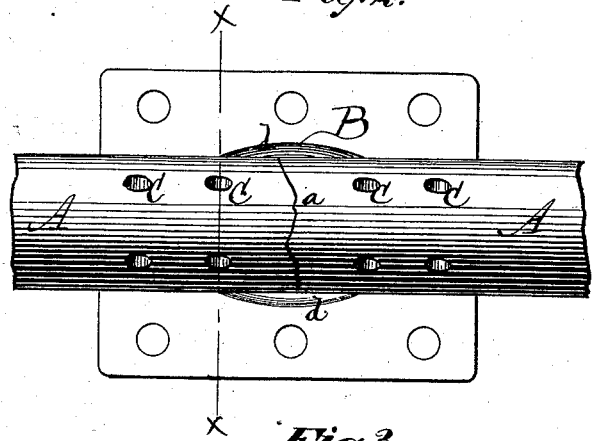
Figure 3:
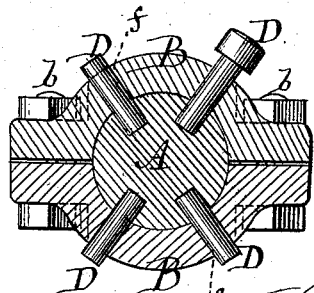

In the accompanying drawing, Figure 1 is a top or side view of a shaft with my improved coupling attached. Fig. 2 is a similar view, with one-half of the clamp removed. Fig. 3 is a transverse section, taken on the line *x x* of Fig. 1.

A represents a shaft which has been broken, as indicated by the line *a*. B is the clamp or coupling, which consists of two halves secured together by bolts *b*. Said clamp may be of cylindrical or approximate form, with flanges to facilitate the securing of the halves together. Through both halves of the clamp a number of holes are bored, and in these holes are fitted a number of pins, C.

When a shaft becomes broken, as indicated by the line *a*, the two broken ends are placed together, and the clamp or coupling B is placed in position, surrounding the shaft, and securely clamped thereto by means of the bolts *b*.

By this means the two parts of the shaft are securely held together, and any burr or bend, or other irregularity which may exist at the broken ends of the shaft, is received by the enlarged cavity *d*, formed in the central portion of the inner side of each half of the clamp.

Holes D, of the same size as the holes *f* in the clamp, are then drilled in the shaft by drills applied through the said holes *f*, and the pins C are inserted in said holes, and driven in tightly, so as to hold the clamp and the shaft securely together.

The pins C may then be cut off close to the outer surface of the clamp, and calked, so as to prevent the possibility of displacement. By this means the two parts of the shaft are securely held together, and by the engagement of the pins and holes all displacement of the parts is prevented, either from lateral or longitudinal strain.

This invention will be found of great advantage for the purpose for which it is designed, owing to the facility which it affords for application in a simple manner and in a short space of time, thus avoiding much delay in repairing broken shafts.

I am aware that a shaft-coupling has been made of two parts hinged together by a longitudinal hinge, and one part of the coupling being provided with dowel-pins projecting from the interior of the said part of the coupling, and fitting into a recess in the shaft; but such is not my invention, which consists, as before stated, in drilling holes entirely through the divided clamp and into the shaft, and then driving pins through said clamp and into the openings in the shaft. By this means I am enabled to repair broken shafts with but little trouble or expense, and with but little delay.

It is of the utmost importance in repairing the broken shaft that the clamps be first arranged around the contiguous ends of the break, and securely fastened in place, and then drill the holes entirely through the same into the shaft, after which the pins are driven into place.

What I claim as new, and desire to secure by Letters Patent, is—

A shaft-coupling for uniting together the ends of a broken shaft, composed of two sections, each having lateral projecting flanges, and a cavity for the play of the ends of the shafts, and provided with a series of transverse openings, which are made to coincide with recesses constructed in the shaft, said openings and recesses serving to receive fastening-pins C after the sections are fitted to the shafts, as herein shown and described, for the object specified.

SINCLAIR STUART.

Witnesses:
MICHAEL RYAN,
BENJAMIN W. HOFFMAN.